US011413599B2

(12) United States Patent
Yoshida et al.

(10) Patent No.: US 11,413,599 B2
(45) Date of Patent: Aug. 16, 2022

(54) CATALYTIC REACTOR

(71) Applicant: Mitsubishi Heavy Industries Engineering, Ltd., Kanagawa (JP)

(72) Inventors: Kaori Yoshida, Kanagawa (JP); Rikio Kan, Hyogo (JP); Naoya Matsumoto, Kanagawa (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 15/734,720

(22) PCT Filed: Jul. 8, 2019

(86) PCT No.: PCT/JP2019/027009
§ 371 (c)(1),
(2) Date: Dec. 3, 2020

(87) PCT Pub. No.: WO2020/013132
PCT Pub. Date: Jan. 16, 2020

(65) Prior Publication Data
US 2021/0220810 A1 Jul. 22, 2021

(30) Foreign Application Priority Data
Jul. 13, 2018 (JP) .............................. JP2018-133332

(51) Int. Cl.
*B01J 19/24* (2006.01)
*B01J 19/32* (2006.01)
*B01J 35/04* (2006.01)

(52) U.S. Cl.
CPC ........... *B01J 19/32* (2013.01); *B01J 19/2485* (2013.01); *B01J 19/325* (2013.01); *B01J 35/04* (2013.01);
(Continued)

(58) Field of Classification Search
None
See application file for complete search history.

(56) References Cited

U.S. PATENT DOCUMENTS 3,597,165 A * 8/1971 Keith ...................... F01N 3/023
422/180
4,028,442 A * 6/1977 Eckert ...................... B01D 3/32
261/94
(Continued)

FOREIGN PATENT DOCUMENTS

EP 3467280 A1 4/2019
JP S53-128345 U 10/1978
(Continued)

OTHER PUBLICATIONS

International Search Report of PCT/JP2019/027009 dated Sep. 10, 2019 (10 pages).
(Continued)

*Primary Examiner* — Jennifer A Leung
(74) *Attorney, Agent, or Firm* — Osha Bergman Watanabe & Burton LLP (57) ABSTRACT

A catalytic reactor according to an embodiment includes a catalytic unit including at least one catalyst having a honeycomb structure in which a plurality of passages extending in an axial direction are formed, a reactor housing accommodating the catalytic unit, and a seal plate sealing between an outer periphery of the catalytic unit and an inner periphery of the reactor housing. The seal plate seals between the outer periphery of the catalytic unit and the inner periphery of the reactor housing at an upstream end portion of the catalytic unit with respect to a flow of a fluid flowing in the reactor housing.

14 Claims, 8 Drawing Sheets

(52) U.S. Cl.
CPC ............. *B01J 2219/2407* (2013.01); *B01J 2219/2427* (2013.01); *B01J 2219/2443* (2013.01); *B01J 2219/32296* (2013.01)

(56) References Cited

U.S. PATENT DOCUMENTS

| | | | |
|---|---|---|---|
| 2002/0131920 | A1 | 9/2002 | Brundage et al. |
| 2011/0030355 | A1* | 2/2011 | Gilmer .............. B23K 31/02 60/299 |
| 2011/0130607 | A1 | 6/2011 | Kolios et al. |
| 2014/0018451 | A1 | 1/2014 | Gamlin et al. |
| 2017/0159529 | A1* | 6/2017 | Kleuderlein .......... F01N 3/2853 |

FOREIGN PATENT DOCUMENTS

| | | |
|---|---|---|
| JP | H07-213865 A | 8/1995 |
| JP | H11-033409 A | 2/1999 |
| JP | 2002-239345 A | 8/2002 |
| JP | 3764568 B2 | 4/2006 |
| JP | 4435964 B2 | 3/2010 |
| JP | 4436005 B2 | 3/2010 |
| JP | 2011-224456 A | 11/2011 |
| JP | 2013-512177 A | 4/2013 |
| JP | 2014-519399 A | 8/2014 |
| JP | 6233545 B2 | 11/2017 |
| JP | 2017-214848 A | 12/2017 |
| WO | 02/072253 A1 | 9/2002 |
| WO | 2009-014025 A1 | 1/2009 |
| WO | 2012/136971 A1 | 10/2012 |
| WO | WO-2018024740 A1 * | 2/2018 .......... B01J 19/2485 |

OTHER PUBLICATIONS

International Preliminary Report on Patentability dated Jan. 28, 2021 in corresponding International (PCT) Application No. PCT/JP2019/027009 (16 pages).
The extended European Search Report dated Apr. 13, 2021, issued to the corresponding EP application No. 19834982.1 (5 pages).
The Office Action dated Jan. 11, 2022, issued in counterpart JP application No. 2018-133332 (11 pages).
The Office Action dated Apr. 19, 2022, issued in counterpart CN application No. 201980041408.4 (16 pages).
Yu Yu Peak, "Process Equipment Design", Northeast University Press, p. 201, Jul. 31, 2016 (3 pages).

* cited by examiner

CATALYTIC REACTOR

TECHNICAL FIELD

The present disclosure relates to a catalytic reactor.

BACKGROUND

For example, in a denitration device installed in a thermal power plant or the like, a catalyst is placed in a reactor of the denitration device (see Patent Document 1).

Further, for example, in a plant for purifying a syngas obtained by gasification of coal, heavy oil, or the like, a catalyst for converting COS (carbonyl sulfide) of sulfur compounds contained in the syngas into $H_2S$ (hydrogen sulfide) is placed in a reactor (see Patent Document 2).

CITATION LIST

Patent Literature

Patent Document 1: JP4436005B
Patent Document 2: JP3764568B

SUMMARY

Problems to be Solved

As the catalyst placed in the reactor disclosed in Patent Documents 1 and 2, for example, a catalyst having a honeycomb structure with a plurality of axially extending passages can be used. Such a catalyst having a honeycomb structure can be formed by extrusion molding into a cylindrical shape or a quadrangular prism shape, but the radial dimension thereof depends on the size of a mold used for extrusion molding.

Therefore, in a reactor used in a plant such as the reactors disclosed in Patent Documents 1 and 2, the dimension of the catalyst having a honeycomb structure is small relative to the dimension of the reactor in the radial direction, i.e., in the direction perpendicular to the flow direction of a gas flowing through the reactor. Thus, in a reactor used in a plant such as the reactors disclosed in Patent Documents 1 and 2, multiple catalysts having a honeycomb structure are arranged in the radial direction.

When multiple catalysts having a honeycomb structure are arranged in the radial direction of the reactor, for example, if there is a gap between the catalysts and the inner peripheral surface of the reactor, the gas bypasses the catalysts through the gap, so that the gas cannot be efficiently brought into contact with the catalysts. Therefore, it is conceivable to suppress the gas flowing through the gap, but Patent Documents 1 and 2 do not disclose a specific measure for suppressing the gas flowing through the gap.

In view of the above, an object of at least one embodiment of the present invention is to efficiently bring a fluid flowing through a catalytic reactor into contact with a catalyst having a honeycomb structure.

Solution to the Problems (1) A catalytic reactor according to at least one embodiment of the present invention comprises: a catalytic unit including at least one catalyst having a honeycomb structure in which a plurality of passages extending in an axial direction are formed; a reactor housing accommodating the catalytic unit; and a seal plate sealing between an outer periphery of the catalytic unit and an inner periphery of the reactor housing. The seal plate seals between the outer periphery of the catalytic unit and the inner periphery of the reactor housing at an upstream end portion of the catalytic unit with respect to a flow of a fluid flowing in the reactor housing.

With the above configuration (1), since the seal plate suppresses the bypassing flow of the fluid through a gap between the outer periphery of the catalytic unit and the inner periphery of the reactor housing, it is possible to efficiently bring the fluid into contact with the catalyst.

(2) In some embodiments, in the above configuration (1), the catalytic unit has a quadrangular prism shape extending in the axial direction, and the reactor housing has a cylindrical shape.

With the above configuration (2), although a gap is formed between the side surface of the catalytic unit of quadrangular prism shape and the inner peripheral surface of the reactor housing of cylindrical shape, the seal plate seals the gap, so that it is possible to efficiently bring the fluid into contact with the catalyst.

(3) In some embodiments, in the above configuration (2), a plurality of the catalytic units are arranged in a direction perpendicular to the axial direction inside the reactor housing.

With the above configuration (3), although when the catalytic units of quadrangular prism shape are arranged in a direction perpendicular to the axial direction, a gap is formed between the outer periphery of the arranged catalytic units and the inner peripheral surface of the reactor housing of cylindrical shape, the seal plate seals the gap, so that it is possible to efficiently bring the fluid into contact with the catalyst.

(4) In some embodiments, in the above configuration (3), the plurality of catalytic units are arranged in a grid shape in the direction perpendicular to the axial direction inside the reactor housing.

With the above configuration (4), although a gap is formed between the outer periphery of the catalytic units arranged in a grid shape and the inner peripheral surface of the reactor housing of cylindrical shape, the seal plate seals the gap, so that it is possible to efficiently bring the fluid into contact with the catalyst.

(5) In some embodiments, in any one of the above configurations (2) to (4), the catalytic unit includes a casing integrally holding the at least one catalyst.

With the above configuration (5), since the casing holds the catalysts, the catalytic unit can be easily attached to and detached from the reactor housing.

6) In some embodiments, in the above configuration (3) or (4), each catalytic unit includes a casing integrally holding the at least one catalyst, and the seal plate is fixed to the reactor housing and the casing of an outermost peripheral catalytic unit of the plurality of catalytic units.

With the above configuration (6), since the seal plate is fixed to the reactor housing and the casing of the outermost peripheral catalytic unit of the plurality of catalytic units, it is possible to improve the sealing effect of the seal plate on the fluid.

(7) In some embodiments, in the above configuration (5) or (6), at least two of the casings arranged in an upper-lower direction are connected to form a connected body of the catalytic units. An upper end portion of the connected body is fixed to the reactor housing via the seal plate, and a lower end portion of the connected body is supported from below by a support member fixed to the reactor housing.

With the above configuration (7), it is possible to reduce the number of upper fixing points and the number of lower supporting points of the catalytic units, compared with the case where each of the catalytic units 104 arranged in the upper-lower direction is fixed to the reactor housing via the seal plate and supported by the support member from below without forming the connected body.

(8) In some embodiments, in the above configuration (7), a plurality of the connected bodies are arranged apart from each other in the upper-lower direction. An upper end portion of each of the connected bodies is fixed to the reactor housing via the seal plate, and a lower end portion of each of the connected bodies is supported from below by a support member fixed to the reactor housing.

With the above configuration (8), since the upper end portion of each of the connected bodies arranged apart from each other in the upper-lower direction is separately fixed to the reactor housing, it is possible to stabilize the posture of each connected body. Further, since each of the connected bodies arranged apart from each other in the upper-lower direction is separately supported from below by the support member, it is possible to reduce the load applied to each connected body and disperse the load applied by the connected bodies to the reactor housing, compared with the case where the connected bodies are further connected in the upper-lower direction and the lowermost connected body is supported by the support member.

(9) In some embodiments, in any one of the above configurations (5) to (8), the at least one catalyst includes a plurality of catalysts arranged such that side surfaces of adjacent catalysts of quadrangular prism shape face each other, and the casing is formed so as to surround an outer periphery of the plurality of catalysts arranged.

With the above configuration (9), since the plurality of catalysts can be integrally held by the casing, the plurality of catalysts can be collectively attached to or detached from the reactor housing by, for instance, attaching or detaching one catalytic unit to or from the reactor housing. As a result, it is possible to improve the efficiency of replacement or the like of the catalysts.

(10) In some embodiments, in the above configuration (9), the at least one catalyst includes a plurality of catalysts arranged in a grid shape.

With the above configuration (10), since the plurality of catalysts arranged in a grid shape can be integrally held by the casing, the plurality of catalysts can be collectively attached to or detached from the reactor housing, for instance, by attaching or detaching one catalytic unit to or from the reactor housing. As a result, it is possible to improve the efficiency of replacement or the like of the catalysts.

(11) In some embodiments, in the above configuration (9) or (10), the catalytic reactor further comprises a seal member disposed between each adjacent catalysts and between each catalyst and the casing.

With the above configuration (11), since the seal member suppresses the flow of the fluid bypassing the catalysts inside the catalytic unit, it is possible to efficiently bring the fluid into contact with the catalyst.

(12) In some embodiments, in any one of the above configurations (9) to (11), the casing has four side walls surrounding the outer periphery of the plurality of catalysts, a first member constituting a first side wall and a second side wall contiguous with the first side wall of the four side walls, and a second member constituting a third side wall and a fourth side wall contiguous with the third side wall of the four side walls. The casing surrounds the outer periphery of the plurality of catalysts by joining the first member to the second member.

With the above configuration (12), the plurality of catalysts can be integrally held by the first member and the second member having a simple structure.

(13) In some embodiments, in any one of the above configurations (9) to (11), the casing has four side walls surrounding the outer periphery of the plurality of catalysts, a first plate member constituting a first side wall of the four side walls, a second plate member constituting a second side wall of the four side walls, a third plate member constituting a third side wall of the four side walls, and a fourth plate member constituting a fourth side wall of the four side walls. The casing surrounds the outer periphery of the plurality of catalysts by joining the first plate member to the second plate member, joining the second plate member to the third plate member, joining the third plate member to the fourth plate member, and joining the fourth plate member to the first plate member.

With the above configuration (13), the plurality of catalysts can be integrally held by the first plate member to the fourth plate member having a simple structure.

(14) In some embodiments, in the above configuration (13), the first plate member, the second plate member, the third plate member, and the fourth plate member are identical in size and structure.

With the above configuration (14), since the type of the plate member is one, i.e., the first plate member to the fourth plate member are identical in structure and size, when the casing is assembled by combining the four plate members, the four plate members can be assembled without distinction, which facilitates the assembling. Further, it is possible to reduce the cost of the plate members.

(15) In some embodiments, in the above configuration (14), the first plate member has a first end portion to be joined to the second plate member and a second end portion to be joined to the fourth plate member, the second plate member has a first end portion to be joined to the third plate member and a second end portion to be joined to the first plate member, the third plate member has a first end portion to be joined to the fourth plate member and a second end portion to be joined to the second plate member, and the fourth plate member has a first end portion to be joined to the first plate member and a second end portion to be joined to the third plate member. The casing surrounds the outer periphery of the plurality of catalysts by joining the first end portion of the first plate member to the second end portion of the second plate member, joining the first end portion of the second plate member to the second end portion of the third plate member, joining the first end portion of the third plate member to the second end portion of the fourth plate member, and joining the first end portion of the fourth plate member to the second end portion of the first plate member.

With the above configuration (15), since the catalytic reactor has the above configuration (14), when the casing is assembled by combining the four plate members, the casing can be simply assembled by repeating the connection between the first end portion of one plate member and the second end portion of another plate member, which facilitates the assembling.

Advantageous Effects

According to at least one embodiment of the present invention, it is possible to efficiently bring a fluid flowing through a catalytic reactor into contact with a catalyst having a honeycomb structure.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
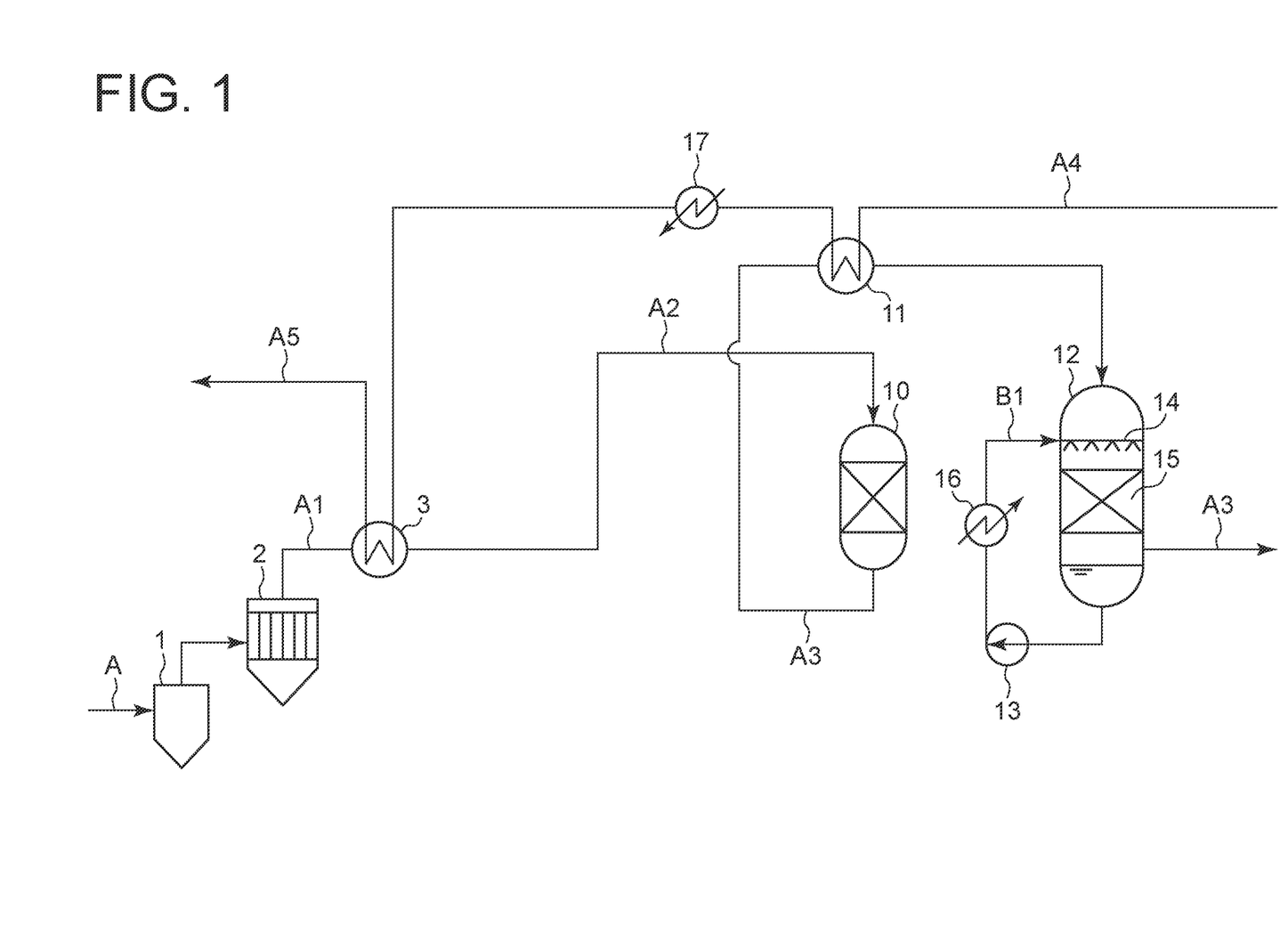
FIG. 1 is a configuration diagram of a pre-treatment part which is a part of a gas purification plant as an example of a plant to which a catalytic reactor according to some embodiments is applied.

FIG. 1 is a configuration diagram of a pre-treatment part which is a part of a gas purification plant as an example of a plant to which a catalytic reactor according to some embodiments is applied.

The gas purification plant of FIG. 1 is a plant for purifying a syngas obtained by gasifying coal as a raw material.

In a gasifier (not depicted), for example, coal is gasified by using air or oxygen as a gasifying agent to produce a syngas A mainly composed of carbon monoxide and hydrogen.

The syngas A obtained by using coal as a raw material and air or oxygen as a gasifying agent usually contains about 1000 to 1500 ppm of $H_2S$ (sulfur compound) and about 100 to 1000 ppm of COS (sulfur compound).

As shown in FIG. 1, the syngas A is first introduced into a cyclone 1 and a porous filter 2 in this order to separate and remove dust having a relatively large diameter and fine dust.

A heat exchanger 3 (re-heater heat exchanger) is disposed downstream of the porous filter 2, in which a purified gas A4 is heated by heat of the gas A1 from the porous filter 2 and is discharged as a gas A5. On the other hand, the gas A1 loses heat and is cooled by the heat exchanger 3.

A catalytic reactor 10 according to some embodiments packed with a catalyst for converting COS to $H_2S$ is disposed downstream of the heat exchanger 3. Most of COS in the syngas A2 cooled by the heat exchanger 3 is converted into $H_2S$ by the catalytic reactor 10 and, the gas is discharged as a gas A3 containing almost no COS.

A heat exchanger 11 (pre-heater heat exchanger) is disposed downstream of the catalytic reactor 10, in which the purified gas A4 is heated by heat of the gas A3 from the catalytic reactor 10. The gas A3 loses heat and is cooled by the heat exchanger 11.

A cooling tower 12 is disposed downstream of the heat exchanger 11, in which the gas A3 comes into gas-liquid contact with a cooling liquid B1 before the gas is introduced to a desulfurization part (not shown) described later.

The cooling tower 12 is a so-called packed gas-liquid contact tower, in which the cooling liquid B1 mainly composed of water and stored in the bottom of the tower is drawn by a circulation pump 13 and sprayed from a spray pipe 14 at the top of the tower, and while flowing downward through a packing material 15, comes into gas-liquid contact with the gas A3, and returns to the bottom of the tower to circulate through the tower.

The circulation line of the circulation pump 13 is provided with a cooler 16 for cooling the cooling liquid B1 using industrial water as a refrigerant, by which heat of the gas A3 is indirectly recovered. Further, in the cooling tower 12, the gas A3 is cooled by contact with the cooling liquid B.

Further, the pre-treatment part of the example shown in FIG. 1 has, in addition to the heat exchanger 11, a heater 17 as pre-treatment means of the present invention. The heater 17 is disposed downstream of the heat exchanger 11 on the discharge line of the purified gas A4 to further heat the gas A4 by heat energy of high temperature steam or the like supplied from outside the system shown in FIG. 1.

In the desulfurization part (not shown), the gas A3 cooled by the cooling tower 12 is brought into gas-liquid contact with an absorbing liquid to remove $H_2S$ from the gas A3. The gas A4 from which $H_2S$ has been removed is heated by the heat exchanger 11, the heater 17, and the heat exchanger 3 and becomes the treated gas A5. The treated gas A5 is supplied to, for example, a gas turbine of a combined power generation system.

Figure 2:
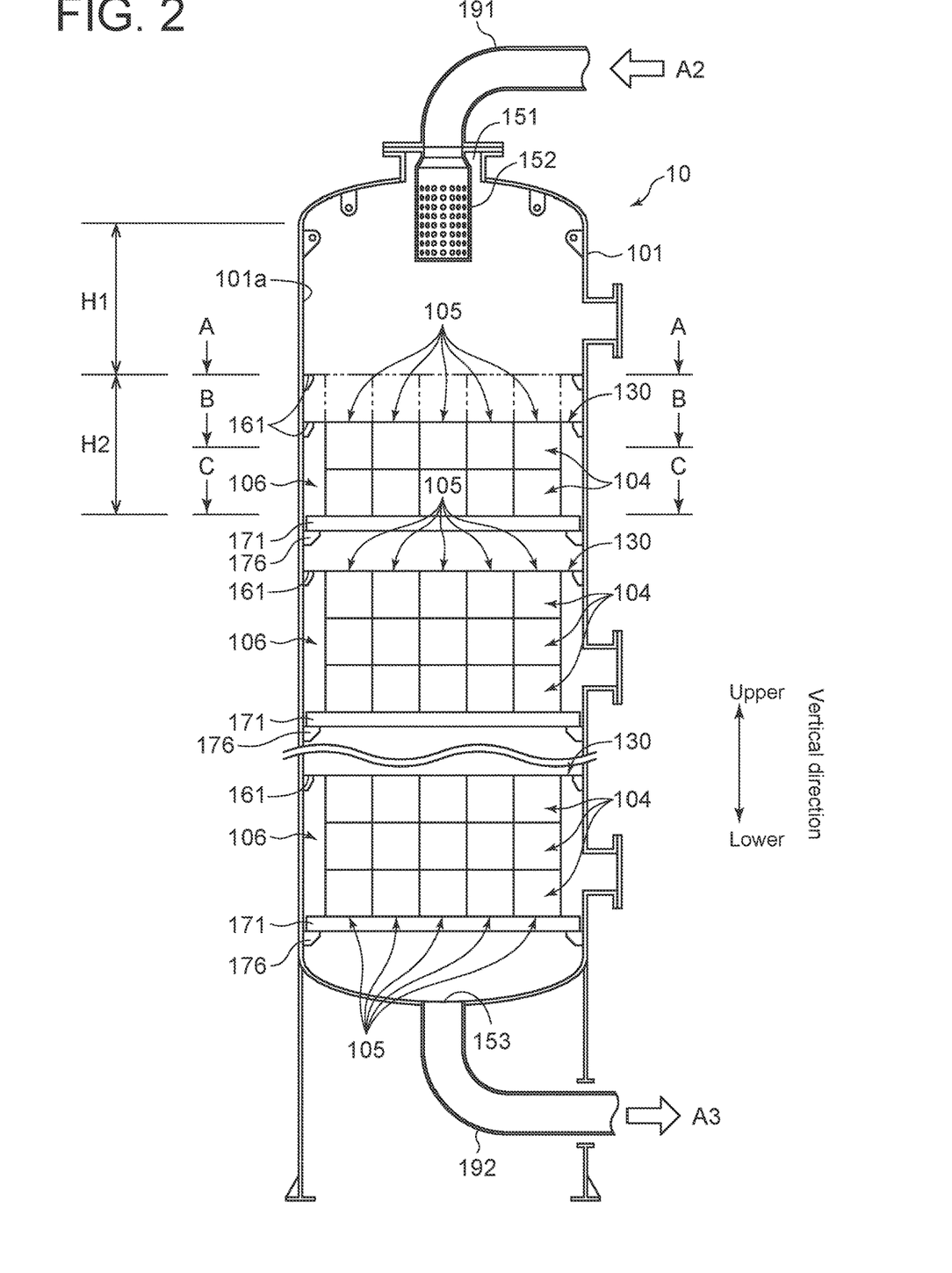
FIG. 2 is a diagram showing a schematic structure of a catalytic reactor according to some embodiments.
Figure 3:
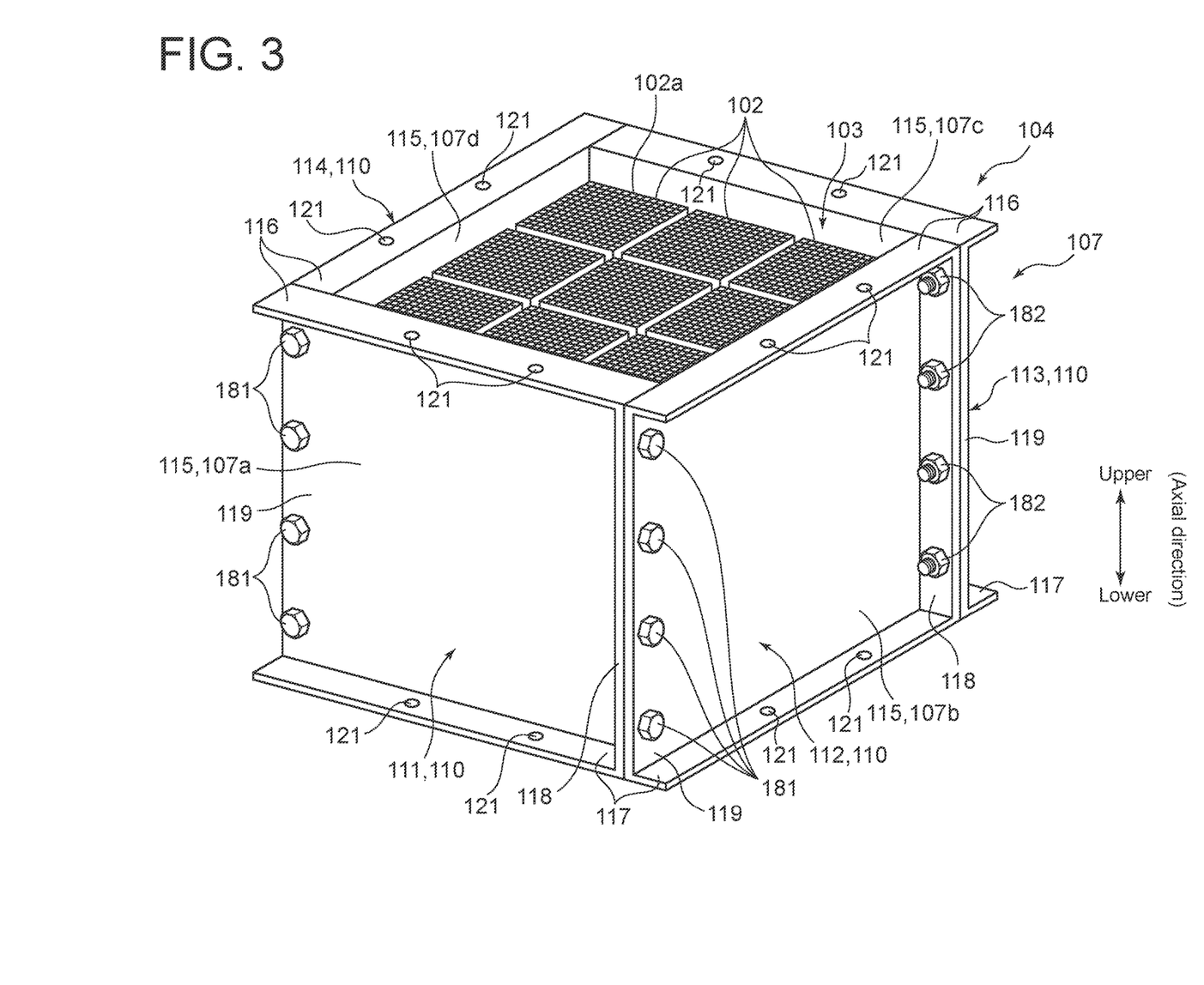
FIG. 3 is a schematic perspective view of a catalytic unit according to an embodiment.
Figure 4:
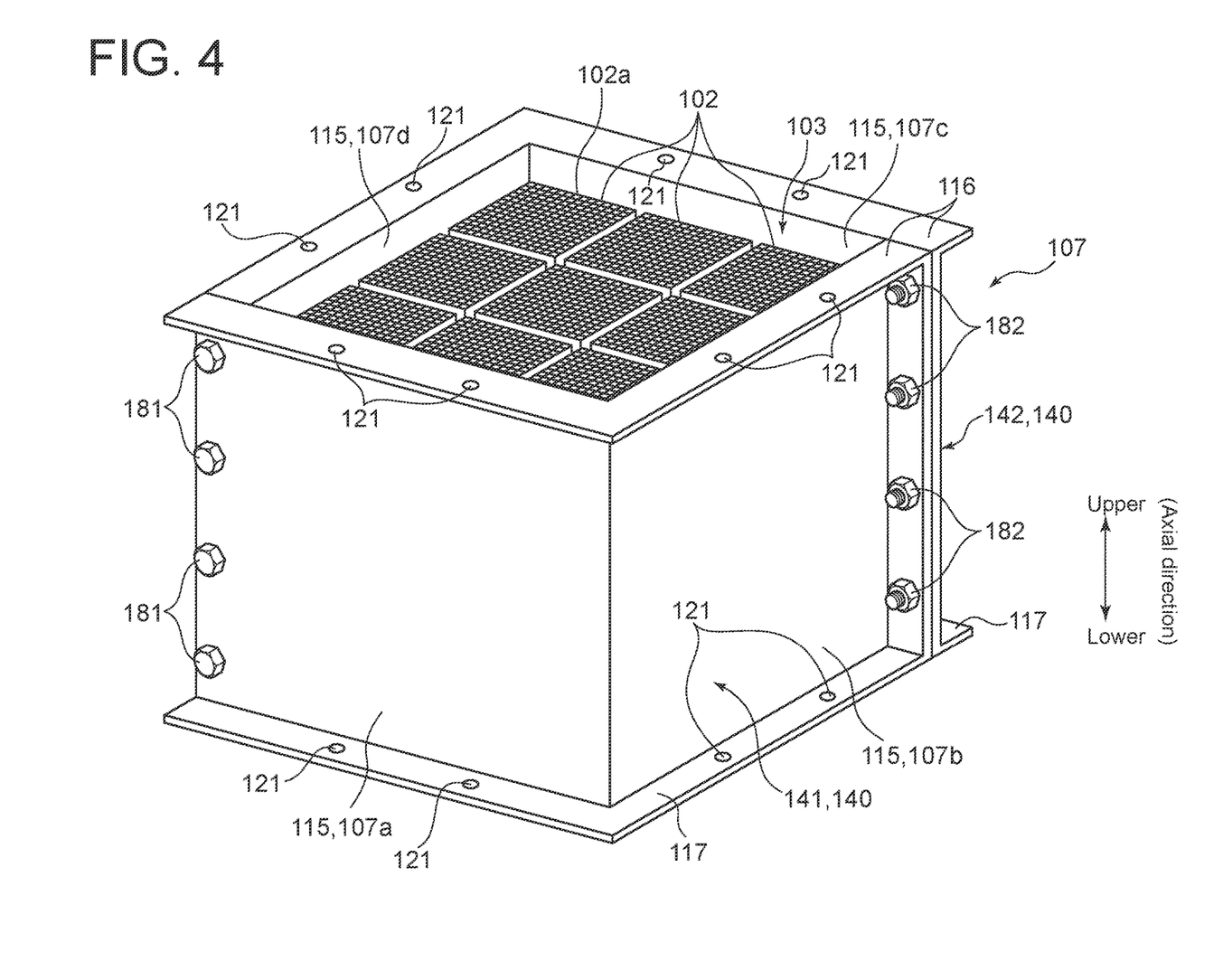
FIG. 4 is a schematic perspective view of a catalytic unit according to another embodiment.
Figure 5:
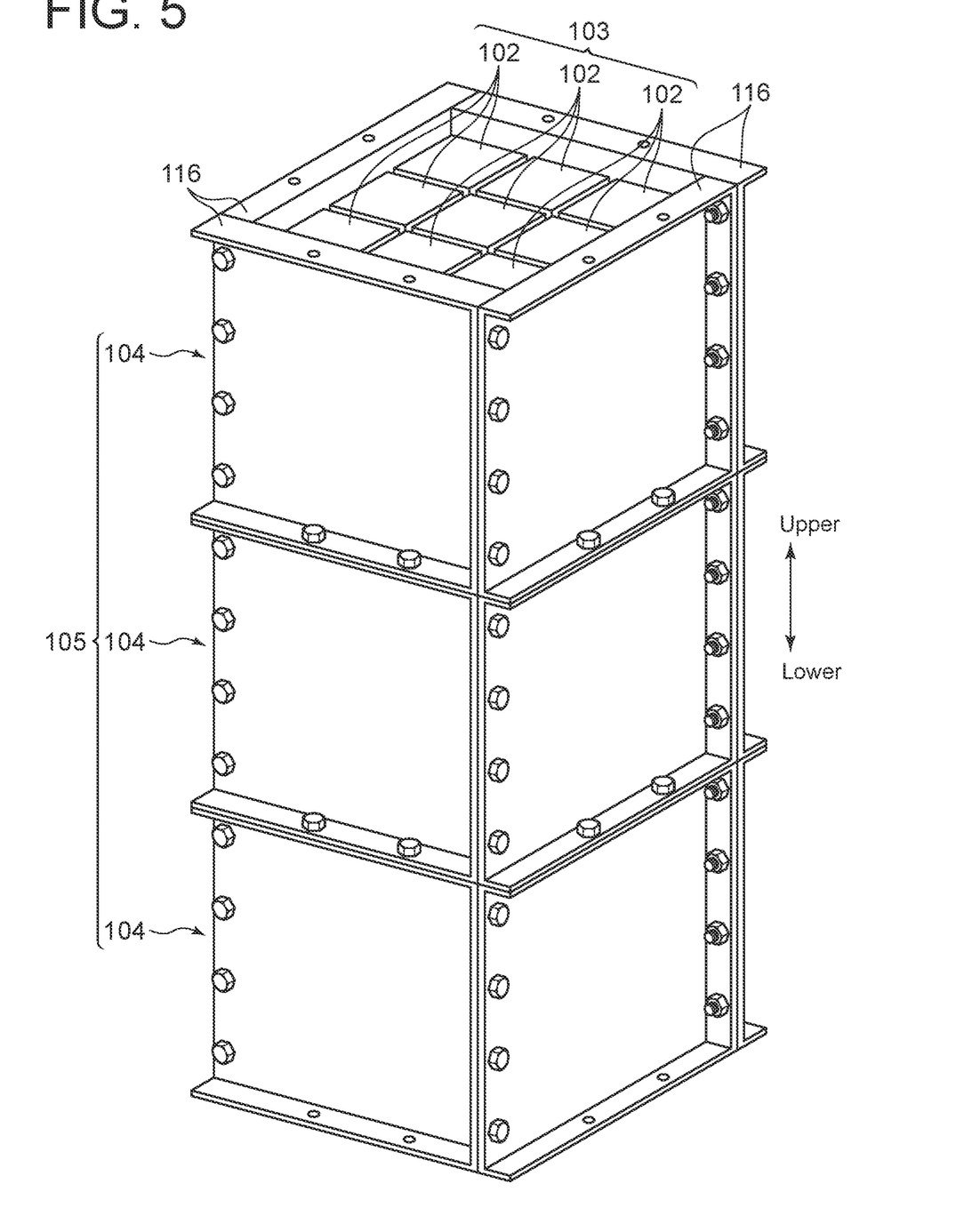
FIG. 5 is a schematic perspective view of a connected body in which catalytic units according to an embodiment are connected.
Figure 6:
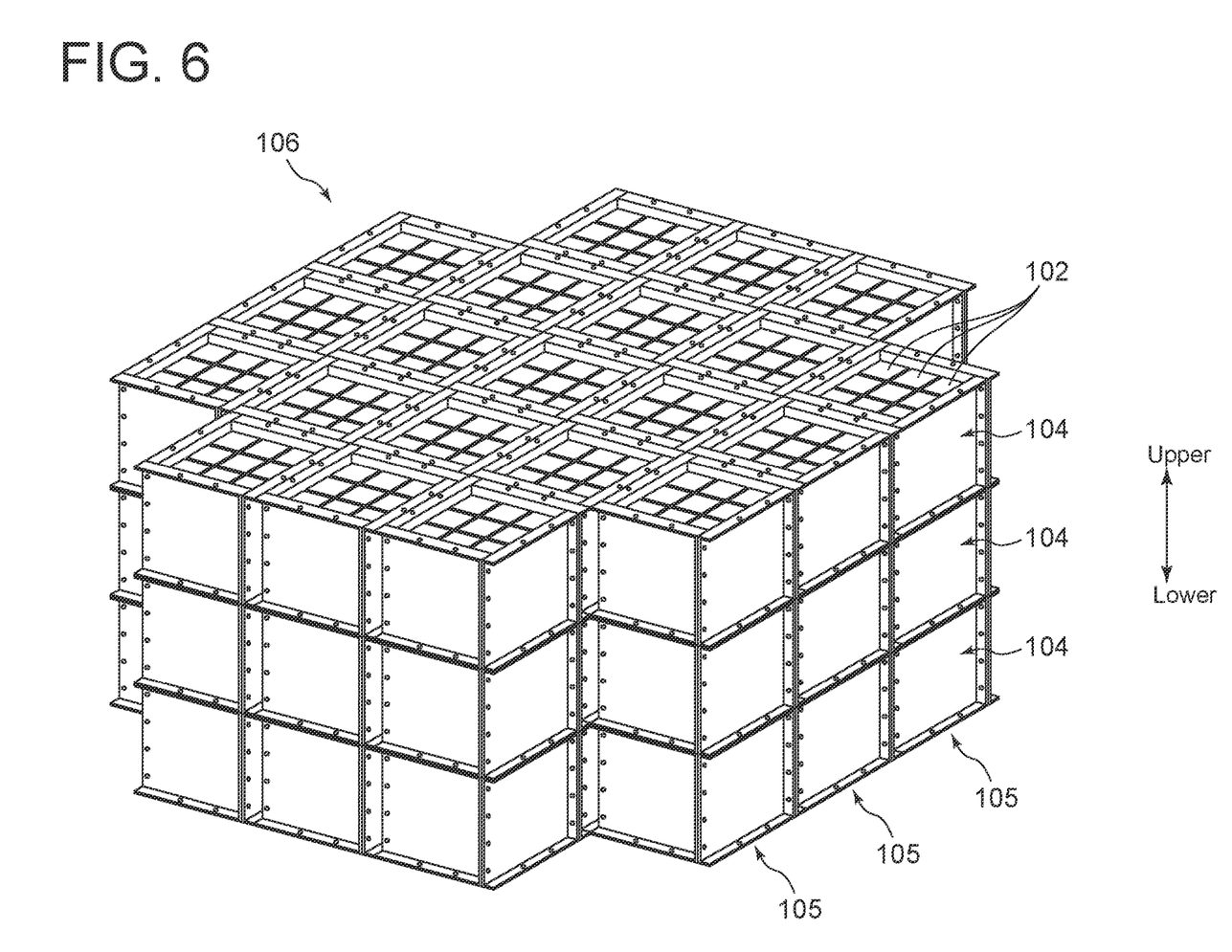
FIG. 6 is a perspective view of a conversion part in which connected bodies are arranged in a grid shape.

FIG. 2 is a diagram showing a schematic structure of a catalytic reactor 10 according to some embodiments. FIG. 3 is a schematic perspective view of a catalytic unit 104 according to an embodiment. FIG. 4 is a schematic perspective view of a catalytic unit 104 according to another embodiment. FIG. 5 is a schematic perspective view of a connected body 105 in which catalytic units 104 according to an embodiment are connected. FIG. 6 is a perspective view of a conversion part 106 in which connected bodies 105 are arranged in a grid shape.

The catalytic reactor 10 according to some embodiments includes a reactor housing 101 having a cylindrical shape extending in the vertical direction, and a catalytic unit 104 (see FIGS. 3 and 4) including a catalyst 102 having a honeycomb structure in which a plurality of passages extending in the axial direction are formed.

Herein, the axial direction indicates an extending direction of passages (cells) 102a (see FIGS. 3 and 4) of the catalyst 102 having a honeycomb structure. In some embodiments, as described later, the catalyst 102 is arranged in the reactor housing 101 so that the extending direction of the passages 102a coincides with the main flow direction of the gas in the reactor housing 101. Accordingly, in some embodiments, when the catalyst 102 is arranged in the catalytic reactor 10, the axial direction is the same as the extending direction of the reactor housing 101 of cylindrical shape, i.e., the vertical direction. For convenience of description, the upper-lower direction is defined as shown in each figure. When constituent members of the catalytic reactor 10 shown in each figure are arranged in the catalytic reactor 10, the upper-lower direction in each figure is the same as the vertical direction.

The catalytic unit 104 according to some embodiments has a quadrangular prism shape extending in the axial direction. The catalytic unit 104 according to some embodiments includes at least one catalyst 102. In the examples shown in FIGS. 3 and 4, the catalyst 102 has a quadrangular prism shape extending in the axial direction, i.e., in the same direction as the extending direction of the passages 102a of the catalyst 102. In the examples shown in FIGS. 3 and 4, the catalyst 102 has a regular quadrangular prism shape with opposite square end surfaces, but the catalyst 102 may not necessarily have a regular quadrangular prism shape.

In the examples shown in FIGS. 3 and 4, the catalytic unit 104 includes, for example, nine catalysts 102. The catalytic unit 104 according to some embodiments has a casing 107 integrally holding the nine catalysts 102. Specifically, in the catalytic unit 104 according to the embodiments shown in FIGS. 3 and 4, the casing 107 has a rectangular tubular shape, and is configured such that a plurality of catalysts 102 can be accommodated in the inner peripheral portion of the rectangular tube. In the catalytic unit 104 according to the embodiments shown in FIGS. 3 and 4, the catalysts 102 are accommodated in the catalytic unit 104 such that the axial direction of the catalysts coincides with the extending direction (upper-lower direction) of the rectangular tube of the casing 107.

Thus, in the catalytic unit 104 according to some embodiments, since the casing 107 holds the catalysts 102, the catalytic unit 104 can be easily attached to and detached from the reactor housing 101. The structure of the catalytic unit 104 will be described in detail later.

As shown in FIG. 5, in the catalytic reactor 10 according to some embodiments, a plurality of catalytic units 104 are connected in the upper-lower direction to form a connected body 105. Further, as shown in FIG. 6, in the catalytic reactor 10 according to some embodiments, a plurality of connected bodies 105 shown in FIG. 5 are arranged in a grid shape in a direction perpendicular to the upper-lower direction (axial direction) to form a conversion part 106. As shown in FIG. 2, in the catalytic reactor 10 according to some embodiments, the conversion part 106 is arranged in the reactor housing 101 such that the upper-lower direction of the connected bodies 105 coincides with the vertical direction. In the catalytic reactor 10 according to some embodiments, a plurality of conversion parts 106 are arranged apart from each other in the vertical direction inside the reactor housing 101.

In some embodiments, in the conversion part 106, the catalytic units 104 are arranged in a grid pattern with 5 rows and 5 columns excluding the four corners, i.e., 21 places except the 1st row and 1st column, 1st row and 5th column, 5th row and 1st column, and 5th row and 5th column. However, the number of catalytic units 104 arranged in the conversion part 106 shown in FIG. 6 is merely illustrative, and the present invention is not limited thereto.

As described above, the catalysts 102 are accommodated in the catalytic unit 104 such that the axial direction of the catalysts coincides with the upper-lower direction of the catalytic unit 104. Further, the conversion part 106 is arranged inside the reactor housing 101 such that the upper-lower direction of the connected bodies 105, each of which is formed by connecting the catalytic units 104 in the upper-lower direction, coincides with the vertical direction. Accordingly, the catalytic unit 104 is accommodated in the reactor housing 101 such that the axial direction, which coincides with the extending direction of the passages 102a of the catalyst 102, is aligned with the vertical direction.

As shown in FIG. 2, in the catalytic reactor 10 according to some embodiments, an introduction pipe 191 for the syngas A2 is connected to a gas inlet (inlet opening) 151 at the top of the reactor housing 101. The syngas A2 (see FIG. 1) containing COS is introduced into the reactor housing 101 through the inlet opening 151.

The downstream end of the introduction pipe 191 is connected to a flow straightener 152 for suppressing the uneven inflow of the syngas A2 into the conversion part 106. The flow straightener 152 has, for example, a bottomed cylindrical shape, and the cylindrical portion has openings for ejecting the syngas A2 fed to the inner periphery.

The syngas A2 introduced into the reactor housing 101 through the flow straightener 152 flows from above to below through multiple stages of the conversion parts 106, so that COS contained in the syngas A2 is converted into $H_2S$ by the catalysts 102.

In the catalytic reactor 10 according to some embodiments, a discharge pipe 192 for the syngas A2 is connected to a gas outlet (outlet opening) 153 at the bottom of the reactor housing 101.

The gas A3 containing $H_2S$ converted from COS by the conversion part 106 is discharged to the discharge pipe 192 through the outlet opening 153.

In such a catalytic reactor 10 according to some embodiments, for example, if there is a gap between the outer periphery of the catalytic unit 104 and the inner periphery (inner peripheral surface 101a) of the reactor housing 101, the syngas A2 bypasses the catalysts 102 through the gap, so that the syngas A2 cannot be efficiently brought into contact with the catalysts 102.

Therefore, the catalytic reactor 10 according to some embodiments includes a seal plate 130 sealing between the outer periphery of the catalytic unit 104 and the inner periphery of the reactor housing 101. In the catalytic reactor 10 according to some embodiments, the seal plate 130 seals between the outer periphery of the catalytic unit 104 and the inner periphery of the reactor housing 101 at an upstream end portion of the catalytic unit 104 with respect to the flow of a fluid (syngas A2) flowing in the reactor housing 101.

Details of the seal plate 130 will be described later.

Thus, since the seal plate 130 suppresses the bypassing flow of the syngas A2 through a gap between the outer periphery of the catalytic unit 104 and the inner periphery of the reactor housing 101, it is possible to efficiently bring the fluid into contact with the catalyst 102.

In the catalytic reactor 10 according to some embodiments, since the catalytic unit 104 has a quadrangular prism shape extending in the axial direction, and the reactor housing 101 has a cylindrical shape, a gap 108 (see FIG. 7 described later) is generated between the side surface of the catalytic unit 104 of quadrangular prism shape and the inner peripheral surface 101a of the reactor housing 101. However, in the catalytic reactor 10 according to some embodiments, since the gap 108 can be sealed by the seal plate 130, it is possible to efficiently bring the fluid into contact with the catalyst 102.

Figure 7:
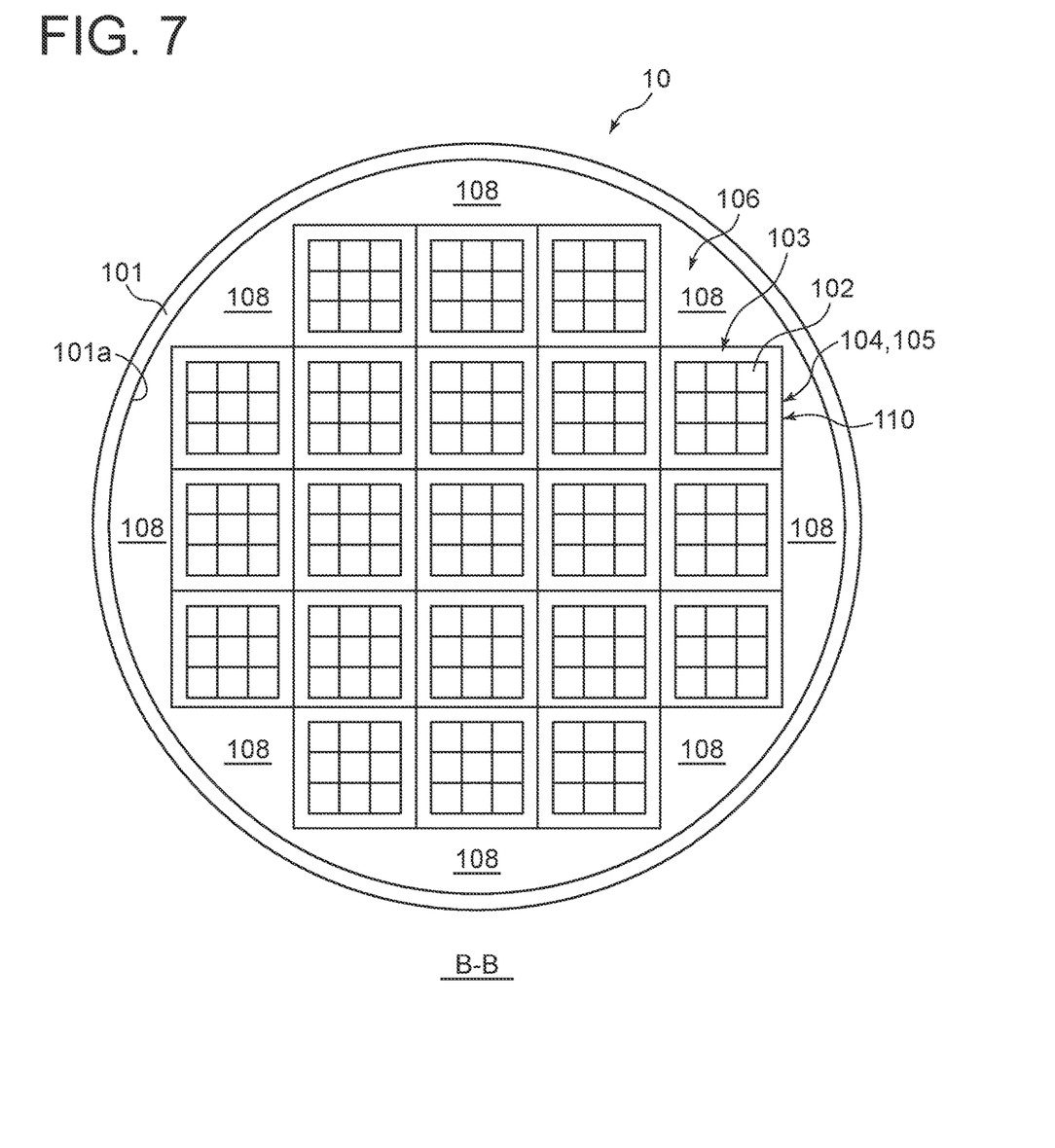
FIG. 7 is a cross-sectional view taken along line B-B in FIG. 2.
Figure 8:
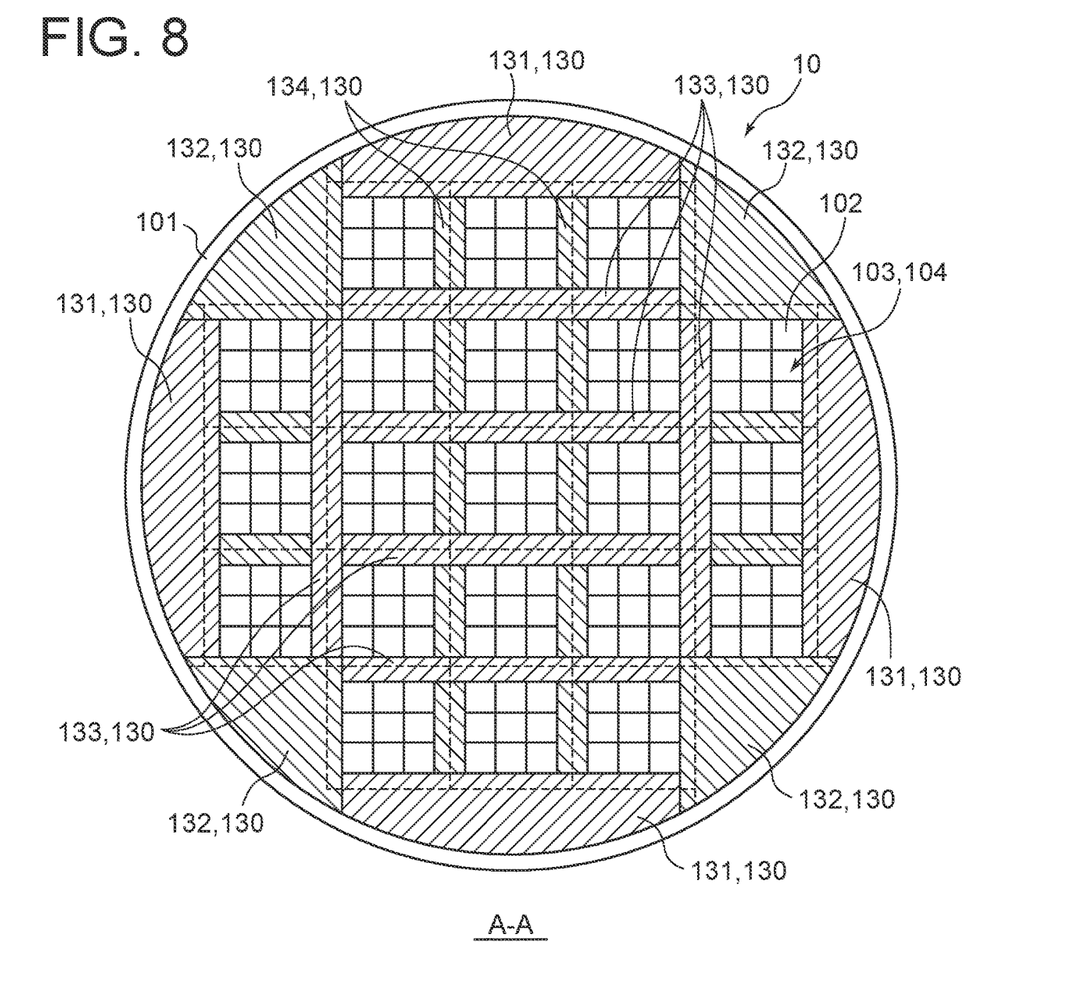
FIG. 8 is a cross-sectional view taken along line A-A in FIG. 2.

In the catalytic reactor 10 according to some embodiments, as shown in FIG. 6, a plurality of catalytic units 104 are arranged in a grid shape in a direction perpendicular to the axial direction inside the reactor housing 101. Accordingly, as shown in FIG. 7, a gap 108 is generated between the outer periphery of the plurality of catalytic units 104 arranged in a grid shape and the inner peripheral surface 101a of the reactor housing 101. FIG. 7 is a cross-sectional view taken along line B-B in FIG. 2. In the catalytic reactor 10 according to some embodiments, however, as shown in FIG. 8, since the gap 108 can be sealed by the seal plate 130, it is possible to efficiently bring the fluid into contact with the catalyst 102. FIG. 8 is a cross-sectional view taken along line A-A in FIG. 2.

(Catalytic Unit 104)

In the catalytic unit 104 according to the embodiments shown in FIGS. 3 and 4, the catalysts 102 are arranged in a grid shape with side surfaces of adjacent catalysts 102 of quadrangular prism shape facing each other. In the catalytic unit 104 according to the embodiments shown in FIGS. 3 and 4, the casing 107 is formed so as to surround the outer periphery of the plurality of arranged catalysts 102.

Thus, since the plurality of catalysts 102 can be integrally held by the casing 107, the plurality of catalysts 102 can be collectively attached to or detached from the reactor housing 101 by, for instance, attaching or detaching one catalytic unit 104 to or from the reactor housing 101. As a result, it is possible to improve the efficiency of replacement or the like of the catalysts 102.

Further, when the catalysts 102 of quadrangular prism shape are arranged in a grid shape, the catalysts 102 can be efficiently placed in the catalytic unit 104 of quadrangular prism shape.

The catalytic unit 104 according to the embodiments shown in FIGS. 3 and 4 has a grating (not shown) for restricting the downward movement of the catalysts 102 with respect to the casing 107. The grating is attached to the casing 107.

The structure of the casing 107 of the catalytic unit 104 according to the embodiment shown in FIG. 3 will now be described.

The casing 107 of the catalytic unit 104 according to the embodiment shown in FIG. 3 has four side walls surrounding the outer periphery of the plurality of catalysts 102. The casing 107 of the catalytic unit 104 according to the embodiment shown in FIG. 3 has a first plate member 111 constituting a first side wall 107a of the four side walls, a second plate member 112 constituting a second side wall 107b of the four side walls, a third plate member 113 constituting a third side wall 107c of the four side walls, and a fourth plate member 114 constituting a fourth side wall 107d of the four side walls.

In the casing 107 of the catalytic unit 104 according to the embodiment shown in FIG. 3, the first plate member 111, the second plate member 112, the third plate member 113, and the fourth plate member 114 are plate members 110 having the same structure and size.

Accordingly, since the casing 107 of the catalytic unit 104 according to the embodiment shown in FIG. 3 has only one type of the plate member 110, i.e., the first plate member 111 to the fourth plate member 114 are identical in structure and size, as will be described later, when the casing 107 is assembled by combining the four plate members 110, the four plate members 110 can be assembled without distinction, which facilitates the assembling. Further, it is possible to reduce the cost of the plate members 110.

The plate member 110 according to the embodiment shown in FIG. 3 has a rectangular plate-like side surface portion 115 corresponding to the side wall surface of the side wall of the casing 107, an upper flange portion 116 formed along the upper side of the side surface portion 115, a lower flange portion 117 formed along the lower side of the side surface portion 115, a first lateral flange portion 118 formed along one lateral side of the side surface portion 115, and a second lateral flange portion 119 formed along the other lateral side of the side surface portion 115.

In the plate member 110 according to the embodiment shown in FIG. 3, the upper flange portion 116, the lower flange portion 117, and the first lateral flange portion 118 are provided in a standing state on the side surface portion 115. In the plate member 110 according to the embodiment shown in FIG. 3, the second lateral flange portion 119 is provided so as to extend in the same direction as the direction in which the surface of the side surface portion 115 extends.

In the plate member 110 according to the embodiment shown in FIG. 3, each of the upper flange portion 116 and the lower flange portion 117 has, for example, two through holes 121 passing through the plate in the thickness direction. In the plate member 110 according to the embodiment shown in FIG. 3, each of the first lateral flange portion 118 and the second lateral flange portion 119 has, for example, four through holes (not shown) passing through the plate in the thickness direction.

In the plate member 110 according to the embodiment shown in FIG. 3, nuts (not shown) are fixed to a lower surface of the upper flange portion 116 at the same positions as the through holes 121 by, for example, welding. In the plate member 110 according to the embodiment shown in FIG. 3, nuts 182 are fixed to a surface of the first lateral flange portion 118 closer to the second lateral flange portion 119 at the same positions as the through holes (not shown) by, for example, welding.

For example, like the first plate member 111 and the second plate member 112 in FIG. 3, while the first lateral flange portion 118 of one plate member 110 faces the second lateral flange portion 119 of another plate member 110, a bolt 181 may be inserted into the through hole (not shown) of the first lateral flange portion 118 of the one plate member 110 and the through hole (not shown) of the second lateral flange portion 119 of the other plate member 110 and is fastened to a nut 182 on the first lateral flange portion 118 to join the one plate member 110 to the other plate member 110. By repeating this operation four times, as shown in FIG. 3, the four plate members 110 can be integrally joined.

That is, in the casing 107 of the catalytic unit 104 according to the embodiment shown in FIG. 3, the first plate member 111 has the first lateral flange portion 118 which is a first end portion to be joined to the second plate member 112, and the second lateral flange portion 119 which is a second end portion to be joined to the fourth plate member 114. Similarly, the second plate member 112 has the first lateral flange portion 118 which is a first end portion to be joined to the third plate member 113, and the second lateral flange portion 119 which is a second end portion to be joined to the first plate member 111. The third plate member 113 has the first lateral flange portion 118 which is a first end portion to be joined to the fourth plate member 114, and the second lateral flange portion 119 which is a second end portion to be joined to the second plate member 112. The fourth plate member 114 has the first lateral flange portion 118 which is a first end portion to be joined to the first plate member 111, and the second lateral flange portion 119 which is a second end portion to be joined to the third plate member 113.

In the casing 107 of the catalytic unit 104 according to the embodiment shown in FIG. 3, the outer periphery of the plurality of catalysts 102 can be surrounded by joining the first lateral flange portion 118 of the first plate member 111 to the second lateral flange portion 119 of the second plate member 112, joining the first lateral flange portion 118 of the second plate member 112 to the second lateral flange portion 119 of the third plate member 113, joining the first lateral flange portion 118 (not shown in FIG. 3) of the third plate member 113 to the second lateral flange portion 119 (not shown in FIG. 3) of the fourth plate member 114, and joining the first lateral flange portion 118 (not shown in FIG. 3) of the fourth plate member 114 to the second lateral flange portion 119 of the first plate member 111.

In the casing 107 of the catalytic unit 104 according to the embodiment shown in FIG. 3, as described above, since the first plate member 111 to the fourth plate member 114 are identical in structure and size, when the casing 107 is assembled by combining the four plate members 110, the casing 107 can be simply assembled by repeating the connection between the first lateral flange portion 118 of one plate member 110 and the second lateral flange portion 119 of another plate member 110, which facilitates the assembling.

As described above, in the casing 107 of the catalytic unit 104 according to the embodiment shown in FIG. 3, the outer periphery of the plurality of catalysts 102 can be surrounded by joining the first plate member 111 to the second plate member 112, joining the second plate member 112 to the third plate member 113, joining the third plate member 113 to the fourth plate member 114, and joining the fourth plate member 114 to the first plate member 111.

Thus, the plurality of catalysts 102 can be integrally held by the first plate member 111 to the fourth plate member 114 having a simple structure.

The method of assembling the catalytic unit 104 according to the embodiment shown in FIG. 3 will now be described. As described above, in the casing 107 of the catalytic unit 104 according to the embodiment shown in FIG. 3, for convenience of description, the following assembling method of the catalytic unit 104 will be described by distinguishing the first plate member 111 to the fourth plate member 114 although the first plate member 111 to the fourth plate member 114 are identical in structure and size.

First, the first plate member 111 and the second plate member 112 are connected with the bolt 181 to form an L-shaped member. The L-shaped member formed by the first plate member 111 and the second plate member 112 is placed on a work floor with the surface of the second plate member 112 corresponding to the outer peripheral surface of the casing 107 facing downward. In this state, the first plate member 111 stands up with the first lateral flange portion 118 of the first plate member 111 facing downward and the second lateral flange portion 119 of the first plate member 111 facing upward. In this state, the grating (not shown) is temporarily fixed to the first plate member 111 and the second plate member 112.

In this state, a plurality of catalysts 102 are placed on the side surface portion 115 of the second plate member 112.

In addition, a seal member (not shown) is disposed between adjacent catalysts 102 and between each catalyst 102 and the casing 107 (side surface portion 115). In some embodiments, the seal member is, for example, a blanket-like member formed by layers of ceramic fibers.

When the seal member is disposed between the catalysts 102 and between each catalyst 102 and the casing 107, the seal member suppresses the flow of the syngas A2 bypassing the catalysts 102 inside the catalytic unit 104, so that it is possible to efficiently bring the syngas A2 into contact with the catalyst 102.

Then, by attaching the third plate member 113 and the fourth plate member 114, the assembly of the catalytic unit 104 is completed.

The casing 107 of the catalytic unit 104 according to the other embodiment shown in FIG. 4 has four side walls surrounding the outer periphery of the plurality of catalysts 102, as with the casing 107 of the catalytic unit 104 according to the embodiment shown in FIG. 3. The casing 107 of the catalytic unit 104 according to the embodiment shown in FIG. 4 has a first member 141 constituting a first side wall 107a and a second side wall 107b contiguous with the first side wall 107a of the four side walls, and a second member 142 constituting a third side wall 107c and a fourth side wall 107d contiguous with the third side wall 107c of the four side walls.

In the casing 107 of the catalytic unit 104 according to the embodiment shown in FIG. 4, the first member 141 and the second member 142 are L-shaped members 140 having the same structure and size.

Accordingly, since the casing 107 of the catalytic unit 104 according to the embodiment shown in FIG. 4 has only one type of the L-shaped member 140, i.e., the first member 141 and the second member 142 are identical in structure and size, when the casing 107 is assembled by combining the two L-shaped members 140, the two L-shaped members 140 can be assembled without distinction, which facilitates the assembling. Further, it is possible to reduce the cost of the L-shaped members 140.

In the casing 107 of the catalytic unit 104 according to the embodiment shown in FIG. 4, the L-shaped member 140 has the same configuration as the L-shaped member obtained by joining two plate members 110 of the casing 107 of the catalytic unit 104 according to the embodiment shown in FIG. 3. Accordingly, the outer periphery of the plurality of catalysts 102 can be surrounded by joining the first member 141 to the second member 142.

Thus, the plurality of catalysts 102 can be integrally held by the first member 141 and the second member 142 having a simple structure.

(Seal Plate 130)

The seal plate 130 will now be described.

In some embodiments, as shown in FIG. 8, the seal plate 130 is fixed to the reactor housing 101 and the casing 107 of an outermost peripheral catalytic unit 104 of the plurality of catalytic units 104.

Specifically, for example, a support ring 161 (see FIG. 2) for fixing the seal plate 130 is attached to the inner peripheral surface 101a of the reactor housing 101. The support ring 161 is a plate-like member having an annular shape, and a nut (not shown) is fixed to the lower surface thereof by, for example, welding.

The seal plate 130 is placed on the upper surface of the support ring 161 and the upper surface of the upper flange portion 116 of the casing 107 of the catalytic unit 104. The seal plate 130 is fixed to the upper surface of the support ring 161 with a bolt (not shown) by fastening the bolt to a nut (not shown) on the lower surface of the support ring 161, for example. Further, the seal plate 130 is fixed to the upper surface of the upper flange portion 116 with a bolt by fastening the bolt to a nut (not shown) fixed to the lower surface of the upper flange portion 116 of the casing 107 of the catalytic unit 104.

A mesh (not shown) may be disposed between the seal plate 130 and the upper surface of the conversion part 106, i.e., the upper surface of the upper flange portion 116 of the casing of the uppermost catalytic unit 104 to fasten the seal plate 130 and the mesh together with a bolt (not shown). The mesh serves to prevent foreign matters flowing into the reactor housing 101 together with the syngas A2 from coming into contact with the catalyst 102. Further, the mesh serves to prevent the operator from directly stepping on the catalyst 102 when the catalytic unit 104 is attached to or detached from the reactor housing 101.

In some embodiments, the seal plate 130 is divided into several parts. For example, the seal plate 130 includes a first seal plate 131 having a substantially arcuate shape, a second seal plate 132 having a substantially triangular shape in which one of three sides has an arc shape, and a third seal plate 133 and a fourth seal plate 134 having a rectangular shape.

For example, the first seal plate 131 is configured to seal a gap 108 between the reactor housing 101 and three catalytic units 104 arranged linearly at the outermost peripheral position among the catalytic units 104 arranged at 21 places in a grid pattern with 5 rows and 5 columns excluding the four corners.

The second seal plate 132 is configured to seal a gap 108 between the reactor housing 101 and catalytic units 104 arranged at the position corresponding to the four corners of the pattern of 5 rows and 5 columns, for example.

For example, the third seal plate 133 and the fourth seal plate 134 are configured to seal a gap between two adjacent catalytic units 104. For example, the third seal plate 133 is configured such that one third seal plate 133 seals a gap between linearly arranged three catalytic units 104 and another linearly arranged three catalytic units 104 adjacent thereto. For example, the fourth seal plate 134 is configured to seal a gap between two adjacent catalytic units 104 other than a region where the first seal plate 131 to the third seal plate 133 seal. The third seal plate 133 and the fourth seal plate 134 also serve to connect adjacent catalytic units 104 (connected bodies 105) to each other at the upper end. The third seal plate 133 and the fourth seal plate 134 are fixed to the upper surface of the upper flange portion 116 of the casing 107 of each of the adjacent catalytic units 104 with a bolt (not shown).

Thus, in some embodiments, since the seal plate 130 is fixed to the reactor housing 101 and the casing 107 of the outermost peripheral catalytic unit 104 of the plurality of catalytic units 104, that it is possible to improve the sealing effect of the seal plate 130 on the syngas A2.

In some embodiments, as described above, at least two casings 107 arranged in the upper-lower direction are connected to each other to form a connected body 105 of the catalytic units 104. In some embodiments, the upper end portion of the connected body 105, i.e., the upper surface of the upper flange portion 116 of the casing 107 of the uppermost catalytic unit 104 of the connected body 105, is fixed to the reactor housing 101 via the seal plate 130 (first seal plate 131 and second seal plate 132).

Further, as shown in FIG. 2, in some embodiments, the lower end portion of the connected body 105 (conversion part 106) is supported from below by a support member 171 fixed to the reactor housing 101.

Thereby, it is possible to reduce the number of upper fixing points and the number of lower supporting points of the catalytic units 104, for example, compared with the case where each of the catalytic units 104 arranged in the upper-lower direction is fixed to the reactor housing 101 via the seal plate 130 and supported by the support member 171 from below without forming the connected body 105.

In some embodiments, as shown in FIG. 2, a plurality of connected bodies 105 are arranged apart from each other in the upper-lower direction. Further, the upper end portion of each of the connected bodies 105 is fixed to the reactor housing 101 via the seal plate 130, and the lower end portion of each of the connected bodies 105 is supported from below by the support member 171 fixed to the reactor housing 101.

Thus, since the upper end portion of each of the connected bodies 105 arranged apart from each other in the upper-lower direction is separately fixed to the reactor housing 101, it is possible to stabilize the posture of each connected body 105. Further, since each of the connected bodies 105 arranged apart from each other in the upper-lower direction is separately supported from below by the support member 171, it is possible to reduce the load applied to each connected body 105 and disperse the load applied by the connected bodies 105 to the reactor housing 101, compared with the case where the connected bodies 105 are further connected in the upper-lower direction and the lowermost connected body 105 is supported by the support member 171.

In some embodiments, the seal plate 130 is fixed to an upper part of the connected body 105 to restrict the horizontal movement of the connected body 105 via the seal plate 130. Further, in some embodiments, the lower end of the connected body 105 is supported by the support member 171 to disperse the load of the connected body 105 and the downward force applied by the syngas A2 to the connected body 105 during operation of the plant by the support member 171. Thus, in some embodiments, the seal plate 130 has a function of restricting horizontal movement of the connected body 105 and a function of sealing the gap 108, while the support member 171 has a function of bearing the load for example acting on the connected body 105. That is, the structure of the seal plate 130 can be simplified by causing the support member 171 to bear the vertical force acting on the connected body 105.

The support member 171 is a beam-like member and is detachably fixed to, for example, a support lug 176 fixed to the inner peripheral surface 101a of the reactor housing 101. Each connected body 105, i.e., each conversion part 106 is placed on the upper surface of the support member 171 and is supported at the lower end by the support member 171.

(Number of Connected Catalytic Units 104 of Connected Body 105)

As shown in FIG. 2, in the catalytic reactor 10 according to some embodiments, except the uppermost conversion part 106, the connected body 105 includes three catalytic units 104 connected in the upper-lower direction. However, the number of connected catalytic units 104 of the connected body 105 is not limited to three but may be two. Hereinafter, the number of connected catalytic units 104 of the connected body 105 is also simply referred to as connection number.

In the catalytic reactor 10 according to some embodiments, in the uppermost conversion part 106, the connected body 105 includes two catalytic units 104 connected in the upper-lower direction. However, the connection number in the uppermost conversion part 106 is not limited to two but may be one, i.e., the catalytic unit 104 may not be connected in the upper-lower direction. Further, the connection number in the uppermost conversion part 106 may be the same as the connection number in the other conversion parts 106. For example, as shown by the double-dotted dashed line in FIG. 2, the connection number in the uppermost conversion part 106 may be three, which is the same as the connection number in the other conversion parts 106.

In this way, when the number of connected catalytic units 104 of the uppermost conversion part 106 is changeable, the capability of the catalytic reactor 10 to convert COS to $H_2S$ can be changed.

Support rings 161 may be provided at multiple positions in the height direction so that the seal plates 130 can be fixed to the support rings 161 (see FIG. 2) even if the number of connected catalytic units 104 of the uppermost conversion part 106 is changed.

(Positional Relationship Between Upper Surface of Uppermost Conversion Part 106 and Upper End of Cylindrical Part of Reactor Housing 101)

A positional relationship between the upper surface of the uppermost conversion part 106 and the upper end of the cylindrical part of the reactor housing 101 will be described. When the catalytic reactor 10 according to some embodiments is used in the gas purification plant shown in FIG. 1, the pressure of the syngas A2 introduced into the catalytic reactor 10 is, for example, 2 to 4 Mpa in terms of gauge pressure. Therefore, the catalytic reactor 10 according to some embodiments has a structure as a pressure vessel. Accordingly, it is desirable that the opening area of the opening is as small as possible, and that the number of openings is as small as possible. In view of this, in the catalytic reactor 10 according to some embodiments, the catalytic unit 104 is configured to be inserted into and removed from the reactor housing 101 through the inlet opening 151 at the top of the reactor housing 101 when the catalytic reactor 10 is installed or when the catalyst 102 is replaced.

In some embodiments, regarding the catalytic unit 104 having a quadrangular prism shape, the diagonal dimension of the catalytic unit in a cross-section perpendicular to the axial direction of the quadrangular prism shape is smaller than the inner diameter of the inlet opening 151. Accordingly, in some embodiments, the catalytic unit 104 can be inserted into and removed from the reactor housing 101 through the inlet opening 151.

When the catalytic unit 104 is inserted into or removed from the reactor housing 101, the introduction pipe 191 and the flow straightener 152 are removed from the top of the reactor housing 101.

For example, when the catalytic unit 104 is inserted into or removed from the reactor housing 101, in terms of work efficiency, it is desirable that the catalytic unit 104 can be inserted into or removed from the reactor housing 101 in the state of the connected body 105. To this end, a space for moving the connected body 105 between the installation position of the connected body 105 in the uppermost conversion part 106 and the inlet opening 151 at the top of the reactor housing 101 is necessary above the conversion part 106. In particular, in the case where the connected body 105 is arranged not directly below the inlet opening 151 but outward of the inlet opening 151 in the radial direction of the reactor housing 101, it is necessary to move the connected body 105 in the radial direction above the conversion part 106.

Therefore, in some embodiments, as shown in FIG. 2, the height H1 from the upper surface of the uppermost conversion part 106 to the upper end of the cylindrical part of the reactor housing 101 is equal to or greater than the height H2 of the connected body 105 installed in the uppermost conversion part 106 with the maximum connection number, that is, H2<H1. With this configuration, even the connected body 105 arranged outward of the inlet opening 151 in the radial direction of the reactor housing 101 can be easily inserted into or removed from the reactor housing 101.

The present invention is not limited to the embodiments described above, but includes modifications to the embodiments described above, and embodiments composed of combinations of those embodiments.

For example, in the above-described embodiments, the plurality of connected bodies 105 are arranged in a grid shape to form the conversion part 106. However, in the conversion part 106, the connected bodies 105 may not be arranged in a grid shape but may be arranged linearly, i.e., arranged in a direction perpendicular to the axial direction.

Further, for example, in the catalytic unit 104, the catalysts 102 may not be arranged in a grid shape but may be arranged linearly, i.e., linearly with side surfaces of adjacent catalysts 102 of quadrangular prism facing each other.

In the above-described embodiments, the catalyst 102 has a quadrangular prism shape with rectangular opposite side surfaces. However, the cross-sectional shape of the catalyst 102 may be a polygonal shape other than the rectangular shape. In other words, the catalyst 102 may have a polygonal prism shape. For example, the catalyst 102 may have a triangular prism shape or a hexagonal prism shape. Alternatively, the cross-sectional shape of the catalyst 102 may be a circular shape or an elliptical shape. In other words, the catalyst 102 may have a cylindrical shape or an elliptic cylindrical shape.

In the above-described embodiments, the shape of the catalytic unit 104 viewed in the upper-lower direction is rectangular. However, the shape of the catalytic unit 104 viewed in the upper-lower direction may be a polygonal shape other than the rectangular shape. In other words, the catalytic unit 104 may have a polygonal prism shape other than the quadrangular prism shape. For example, the catalytic unit 104 may have a triangular prism shape or a hexagonal prism shape. Alternatively, the shape of the catalytic unit 104 viewed in the upper-lower direction may be a circular shape or an elliptical shape. In other words, the catalytic unit 104 may have a cylindrical shape or an elliptic cylindrical shape.

Although in the above-described embodiments, the conversion part 106 includes a plurality of connected bodies 105, the number of connected bodies 105 included in one conversion part 106 is at least one.

Although in the above-described embodiments, the reactor housing 101 has a cylindrical shape, the reactor housing may not have a cylindrical shape but may have a rectangular tube shape.

Although not particularly mentioned in the above-described embodiments, the plate member 110 may be appropriately provided with a reinforcing member to improve the strength of the rectangular plate-like side surface portion 115 and the strength of each flange portion.

REFERENCE SIGNS LIST

10 Catalytic reactor
101 Reactor housing
102 Catalyst
104 Catalytic unit
105 Connected body
106 Conversion part
107 Casing
108 Gap
110 Plate member
111 First plate member
112 Second plate member
113 Third plate member
114 Fourth plate member
130 Seal plate
140 L-shaped member
141 First member
142 Second member
151 Inlet (Inlet opening)
152 Flow straightener
153 (Outlet) (Outlet opening)
171 Support member

The invention claimed is:

1. A catalytic reactor, comprising:
catalytic units, each including:
one or more catalysts having a honeycomb structure including passages extending in an axial direction of the catalytic reactor;
a reactor housing accommodating the catalytic units; and
a seal plate that seals, at an upstream end with respect to a flow of a fluid flowing in the reactor housing, an outer periphery of one or more of the catalytic units and an inner periphery of the reactor housing,
wherein each of the catalytic units includes a casing integrally holding the one or more catalysts,
wherein two or more of the catalytic units are connected to each other, via the respective casing, in an upper-lower direction of the catalytic reactor, to form one or more connected bodies,
wherein an upper end portion of each of the one or more connected bodies is fixed to the reactor housing via the seal plate, and a lower end portion of each of the one or more connected bodies is supported from below by a support member fixed to the reactor housing,
wherein the casing of each of the catalytic units includes an upper flange portion along an upper side of a side surface portion of the respective casing,
wherein a support ring for fixing the seal plate is attached to the inner periphery of the reactor housing, and
wherein the seal plate is disposed on an upper surface of the support ring and an upper surface of the upper flange portion of the respective casing of the one or more of the catalytic units at the upper end portion of the one or more connected bodies.

2. The catalytic reactor according to claim 1,
wherein each of the catalytic units has a quadrangular prism shape extending in the axial direction, and
wherein the reactor housing has a cylindrical shape.

3. The catalytic reactor according to claim 1,
wherein the catalytic units are disposed in a direction perpendicular to the axial direction inside the reactor housing.

4. The catalytic reactor according to claim 3,
wherein the catalytic units are disposed in a grid shape in the direction perpendicular to the axial direction inside the reactor housing.

5. The catalytic reactor according to claim 3,
wherein the seal plate is fixed to the reactor housing and the respective casing of an outermost peripheral one of the catalytic units.

6. The catalytic reactor according to claim 1, comprising a plurality of the connected bodies,
wherein the plurality of the connected bodies are disposed apart from each other in the upper-lower direction, and
wherein the upper end portion of each of the connected bodies is fixed to the reactor housing via the seal plate, and the lower end portion of each of the connected bodies is supported from below by the support member.

7. The catalytic reactor according to claim 1, comprising a plurality of the catalysts,
wherein the plurality of the catalysts have a quadrangular prism shape,
wherein side surfaces of adjacent ones of the catalysts face each other, and
wherein the respective casing of the catalytic units surrounds an outer periphery of the adjacent catalysts.

8. The catalytic reactor according to claim 7,
wherein the adjacent catalysts are disposed in a grid shape.

9. The catalytic reactor according to claim 7, further comprising a seal member disposed between each of the adjacent catalysts and between each of the catalysts and the respective casing of the catalytic units.

10. The catalytic reactor according to claim 7,
wherein the respective casing of the catalytic units has four side walls surrounding the outer periphery of the adjacent catalysts,
wherein a first member constitutes a first side wall and a second side wall contiguous with the first side wall of the four side walls,
wherein a second member constitutes a third side wall and a fourth side wall contiguous with the third side wall of the four side walls, and
wherein the respective casing of the catalytic units surrounds the outer periphery of the adjacent catalysts by joining the first member to the second member.

11. The catalytic reactor according to claim 7,
wherein the respective casing of the catalytic units has four side walls surrounding the outer periphery of the adjacent catalysts,
wherein a first plate member constitutes a first side wall of the four side walls,
wherein a second plate member constitutes a second side wall of the four side walls,
wherein a third plate member constitutes a third side wall of the four side walls, and
wherein a fourth plate member constitutes a fourth side wall of the four side walls, and
wherein the respective casing of the catalytic units surrounds the outer periphery of the adjacent catalysts by joining the first plate member to the second plate member, joining the second plate member to the third plate member, joining the third plate member to the fourth plate member, and joining the fourth plate member to the first plate member.

12. The catalytic reactor according to claim 11,
wherein the first plate member, the second plate member, the third plate member, and the fourth plate member are identical in size and structure.

13. The catalytic reactor according to claim 12,
wherein the first plate member has a first end portion to be joined to the second plate member and a second end portion to be joined to the fourth plate member,
wherein the second plate member has a first end portion to be joined to the third plate member and a second end portion to be joined to the first plate member,
wherein the third plate member has a first end portion to be joined to the fourth plate member and a second end portion to be joined to the second plate member,
wherein the fourth plate member has a first end portion to be joined to the first plate member and a second end portion to be joined to the third plate member, and
wherein the respective casing of the catalytic units surrounds the outer periphery of the adjacent catalysts by joining the first end portion of the first plate member to the second end portion of the second plate member, joining the first end portion of the second plate member to the second end portion of the third plate member, joining the first end portion of the third plate member to the second end portion of the fourth plate member, and joining the first end portion of the fourth plate member to the second end portion of the first plate member.

14. The catalytic reactor according to claim 1,
wherein the support member is beam-shaped and is detachably fixed to a support lug fixed to the inner periphery of the reactor housing.

\* \* \* \* \*